United States Patent
van Leeuwen et al.

(10) Patent No.: US 7,407,592 B2
(45) Date of Patent: *Aug. 5, 2008

(54) OZONE RETENTION METHOD AND SYSTEM

(75) Inventors: Johannes van Leeuwen, Story, IA (US); Michael D. Jennings, Ellicott City, MD (US); Richard A. Mueller, Olmsted Falls, OH (US); Jack H. Robinson, Clifton, VA (US)

(73) Assignee: Nutech 03, Inc., Arlington, VA (US)

( * ) Notice: Subject to any disclaimer, the term of this patent is extended or adjusted under 35 U.S.C. 154(b) by 423 days.

This patent is subject to a terminal disclaimer.

(21) Appl. No.: 11/230,571

(22) Filed: Sep. 21, 2005

(65) Prior Publication Data

US 2006/0021951 A1 Feb. 2, 2006

Related U.S. Application Data

(63) Continuation-in-part of application No. 11/039,819, filed on Jan. 24, 2005, now Pat. No. 7,273,562, which is a continuation-in-part of application No. 10/402,298, filed on Mar. 31, 2003, now Pat. No. 6,869,540.

(60) Provisional application No. 60/372,806, filed on Apr. 17, 2002.

(51) Int. Cl.
*C02F 1/78* (2006.01)
*B63B 39/03* (2006.01)

(52) U.S. Cl. .................... 210/760; 210/931; 114/125

(58) Field of Classification Search ............ 210/760, 210/764, 192, 199, 205, 242.1, 931; 422/28, 422/186.07; 114/74 R, 125
See application file for complete search history.

(56) References Cited

U.S. PATENT DOCUMENTS 3,937,662 A 2/1976 Bartik
4,314,519 A * 2/1982 Yunoki et al. ............... 114/125

(Continued)

FOREIGN PATENT DOCUMENTS

JP 2004/160437 6/2004

(Continued)

OTHER PUBLICATIONS

High Efficiency In-Line Pressureized Ozone Contacting with the GDT™ Process, http://www.mazzei.net/articles_publications/papers/GDTPaper4.pdf, Berlin, Germany, Apr. 22, 1997.

(Continued)

*Primary Examiner*—Frank M Lawrence
(74) *Attorney, Agent, or Firm*—Caesar, Rivise, Bernstein, Cohen & Pokotilow, Ltd.

(57) ABSTRACT

A method and system of ozone treatment diverts a portion of water from a flow of water in a conduit, injects ozone into the portion to provide an ozonated portion, and recombines the ozonated portion with the flow of water in the conduit. Another method and system identifies a species-destructive reaction product of ozone with a water constituent, determines a life of the reaction product, and contacts ozone with a water containing the species for a period determined according to the determined life of the reaction product.

16 Claims, 4 Drawing Sheets

U.S. PATENT DOCUMENTS

| | | | |
|---|---|---|---|
| 4,317,333 A | 3/1982 | Webby | |
| 4,364,516 A | 12/1982 | Rhoades et al. | |
| 4,619,763 A | 10/1986 | O'Brian | |
| 5,040,487 A * | 8/1991 | Bollyky et al. | 119/234 |
| 5,218,988 A | 6/1993 | McNamara et al. | |
| 5,494,576 A | 2/1996 | Hoppe et al. | |
| 5,679,257 A * | 10/1997 | Coate et al. | 210/695 |
| 5,785,067 A | 7/1998 | Kosofsky | |
| 5,803,982 A | 9/1998 | Sosofsky et al. | |
| 5,816,181 A | 10/1998 | Sherman, Jr. | |
| 5,863,128 A | 1/1999 | Mazzei | |
| 5,932,112 A | 8/1999 | Browning, Jr. | |
| 6,000,418 A | 12/1999 | Kern et al. | |
| 6,007,726 A * | 12/1999 | Yang et al. | 210/752 |
| 6,053,121 A | 4/2000 | Tamashima et al. | |
| 6,106,731 A * | 8/2000 | Hayes | 210/760 |
| 6,125,778 A * | 10/2000 | Rodden | 114/74 R |
| 6,165,371 A | 12/2000 | Allen | |
| 6,205,981 B1 | 3/2001 | Lorraine | |
| 6,231,769 B1 * | 5/2001 | Pean et al. | 210/760 |
| 6,402,965 B1 * | 6/2002 | Sullivan et al. | 210/748 |
| 6,432,304 B1 * | 8/2002 | Nguyen | 210/748 |
| 6,500,345 B2 | 12/2002 | Constantine et al. | |
| 6,516,738 B2 * | 2/2003 | Cannon | 114/125 |
| 6,602,426 B2 * | 8/2003 | Hulsey et al. | 210/754 |
| 6,613,232 B2 * | 9/2003 | Chesner et al. | 210/650 |
| 6,723,233 B1 * | 4/2004 | Barnes | 210/167.11 |
| 6,840,983 B2 | 1/2005 | McNulty | |
| 2002/0088758 A1 | 7/2002 | Blumenschein et al. | |
| 2002/0162803 A1 | 11/2002 | Haney | |
| 2002/0191483 A1 | 12/2002 | Ohtsuki et al. | |
| 2003/0015481 A1 * | 1/2003 | Eidem | 210/760 |
| 2004/0050798 A1 * | 3/2004 | Schulz et al. | 210/760 |
| 2004/0055966 A1 * | 3/2004 | Nguyen et al. | 210/748 |
| 2004/0060876 A1 * | 4/2004 | Tipton | 210/748 |

FOREIGN PATENT DOCUMENTS

| | | | |
|---|---|---|---|
| WO | WO 00/20338 | * | 4/2000 |

OTHER PUBLICATIONS

Maceky, Tagg and Parsons, Technologies for Ballast Water Management, International Cooperation on Marine Engineering Systems, New York, May 22-23, 2000.

Oemcke, The Treatment of Ships' Ballast Water, EcoPorts Monograph Series No. 18, Mar. 1999.

Oemcke, The Treatment of Ships' Ballast Water, Ecoports Monograph Series No. 18, Mar. 1999.

International Search Report and Written Opinion PCT/US2005/045738, filed Aug. 30, 2006, PCT.

* cited by examiner

OZONE RETENTION METHOD AND SYSTEM

This application in a continuation-in-part application of copending U.S. application Ser. No. 11/039,819, filed Jan. 24, 2005, now U.S. Pat. No. 7,273,562, which in turn is a continuation-in-part of copending U.S. application Ser. No. 10/402,298, filed Mar. 31, 2003, now U.S. Pat. No. 6,869,540, which claims the benefit of U.S. Provisional Application Ser. No. 60/372,806, filed Apr. 17, 2002, now expired, all the disclosures of which are incorporated herein by reference in their entirety.

This invention was made with government support under Contract No. NA04OAR awarded by the National Oceanic and Atmospheric Administration, Department of Commerce. The government has certain rights in the invention.

BACKGROUND OF THE INVENTION

The invention relates to a ballast water ozone injection method and system. More particularly, the invention relates to a system for injecting ozone to treat water during loading or discharge to or from the ballast tanks of a vessel or ship.

Ballast water weight is used by sea vessels to compensate for a lack of cargo weight when the cargo load is empty or partially empty in order to maintain the ship's stability For example in a typical transport operation, a vessel docks at a first port where it is loaded with a cargo that is transports to a second port where the cargo is unloaded. The vessel then returns to the first port where it is loaded with another cargo. Typically, the vessel travels empty from the second port back to the first port to pick up another cargo. The vessel is equipped with ballast tanks that can be filled with water to maintain the balance of the vessel when it travels empty and that is discharged as cargo is loaded.

Ballast water contains species that are indigenous to the ballast tank filling location. These species are loaded into the ballast tanks along with the water. The vessel then transports ballast water to a cargo loading port where the species are discharged into the water environment along with the ballast water. The discharged species may be nonindigenous and deleterious to the discharge water environment. The nonindigenous species may cause damage to the water environment and replace benthic organisms and clear plankton communities that provide food and larvae for desirable resident native species.

In 1996, Congress passed the National Invasive Species Act (P. L. 104-332) ("NAIS") to stem the spread of nonindigenous organisms through ballast water discharge. The act reauthorized the Great Lakes ballast management program and expanded applicability to vessels with ballast tanks. The Act requires the Secretary of Transportation to develop national guidelines to prevent the spread of organisms and their introduction into U.S. waters via ballast water of commercial vessels. Proposed amendment of the National Aquatic Invasive Species Act (S 525 & HR 1080) (NAIS) would require that all ballast water discharged within the territorial waters of the United States (i.e. within 200 miles of the Coast or in the Great Lakes) be treated so as to kill or remove all aquatic nuisance species (i.e. bacteria, viruses, larvae, phytoplankton and zooplankton).

The water loaded into ballast tanks is a complex composition of physical, chemical and biological entities. Further, the composition of the water varies considerably from port to port, particularly in terms of biological constituents. The complexity and variation of the water makes disinfectant treatment unpredictable. Various known methods and systems for treating water may not work for treating ballast water because of a resistant life form or unexpected chemical constituency or a proposed treatment itself may degrade an environment upon discharge.

Ozonation has been found to be a safe and effective disinfectant method and system to treat ballast water for discharge into destination water environments. Rodden U.S. Pat. No. 6,125,778 first suggested an ozone ballast water treatment that included sparging into ballast water tanks.

However direct tank sparging may make ozonation disinfection expensive and ineffective as not all spaces in ballast tanks may be reached. Robinson et al. U.S. Pat. No. 6,869,540 (Robinson) has suggested an in-line treatment of loading and/or unloading ballast water. The Robinson method can comprise injecting ozone into a line of water loading into a sea faring vessel prior to charging the water into a ballast tank; charging the ozone injected water into the ballast tank; and adjusting a rate of injection of the ozone into the water and adjusting the rate of water loading into the vessel to provide a target biokill of species within the water.

Robinson ozonation achieves disinfection by a sequential and combined two mechanism effect—ozonation and bromination. Ozone directly kills species by oxidation. Additionally, a reaction between ozone and naturally occurring seawater bromides results in a disinfecting bromination through the formation of hypobromous ion and hypobromous acid. The effect of the ozonation and bromination disinfecting processes has been found to be synergistic in that the combined effect is an improvement over the effects of the separate disinfectant processes.

While in-line ozonation of seawater during pumping intake or discharge is more effective and more economical than in-tank treatment, in some instances there are serious cost restrictions on direct ozonation. For example, ballast water intake/discharge lines on vessels in the 100,000 to 150,000 DWT range are 18" in diameter. The cost of equipment for direct injection into this size line is prohibitive. There is a need for an uncomplicated and cost effective system and method for direct ozonation of intake/discharge ballast water.

BRIEF DESCRIPTION OF THE INVENTION

A first aspect of the invention is a method of ozone treatment, comprising: identifying a species-destructive reaction product of ozone with a water constituent; determining a life of the reaction product; and contacting ozone with a water containing the species for a period determined according to the determined life of the reaction product.

Another embodiment is a method of ozone treatment, comprising: diverting a portion of water charging into a ballast tank of a vessel; injecting ozone into the portion to provide an ozonated portion; recombining the ozonated portion with the water charging into the ballast tank; wherein a retention period between injecting the ozone into the portion and recombining the injected ozone portion with the water charging into the tank is controlled below a specified time limit.

And another embodiment is a ballast-water treatment system comprising: a vessel including at least one ballast tank; an ozone generator that generates ozone; a ballast water conduit that transports water from a first intake location to a discharge location of a vessel; a bypass line from a first point of the water conduit to a second, return point to divert a portion of the water from the conduit for circulation in the bypass line and back to the water conduit at the return point; and an injector to inject ozone into the diverted portion of water and interposed in the bypass line at a location to provide a determined retention time period between a point of ozone injection and a point of recombining the injected portion with the water charging to the ballast tank.

DETAILED DESCRIPTION OF THE INVENTION

Figure 1:
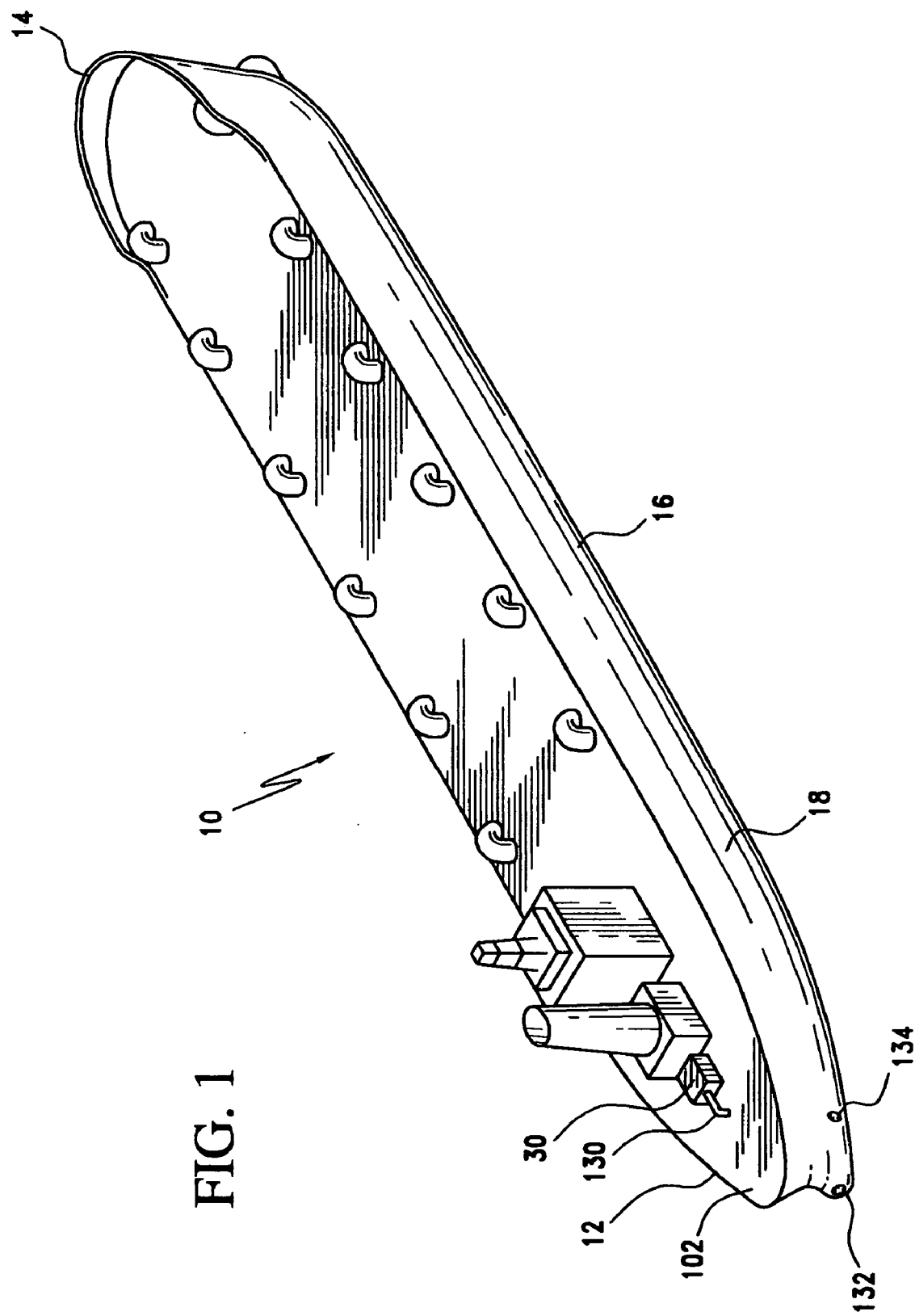
FIG. 1 is a schematic perspective view of a double hulled vessel and treatment system.

Ozone is generated at a pressure of about 10-12 psi above atmospheric. Deviations from this pressure will adversely affect ozone output. Ballast water is pumped aboard at variable pressure, which may be high as tanks are filled. Relatively low-pressure ozone/oxygen or ozone/air mixtures can be compressed to a higher pressure by very special and expensive equipment (due to the corrosivity of ozone and more importantly, the fact that ozone will decompose under the heat of compression).

In an embodiment, the invention relates to ozone ballast water treatment. Proposed NAIS amendments define "ballast water" as "any water (with its suspended matter) used to maintain the trim and stability of a vessel." In another definition. "ballast water" is A) water taken on board a vessel to control trim, list, draught, stability or stresses of a vessel including matter suspended in such water; and B) any water placed in a ballast tank during cleaning, maintenance or other operations." These definitions are incorporated into this specification as embodiments of treatable water.

In an embodiment of the invention, an inline gas injector such as a venturi is interposed to temporarily lower pressure of flowing ballast water by increasing the velocity of the water flow in a conduit. An interposed inline injector can create a lower pressure by increasing liquid velocity. A venturi is a preferred injector in an inline injection ballast water treatment.

In an embodiment, the invention relates to a ballast water treatment system for a vessel. The system can comprise an injector interposed in a water conduit with an inlet port adapted to receive the water, an injector port adapted to receive a treating gas and an outlet port adapted to expel the water. However, ballast water conduits that charge water to or discharge water from a ballast tank are large, typically on the order of about 18 inches in diameter. The cost of an injector such as a venturi for a conduit of this size is substantial. Further, installing such an injector into a main conduit will impact operational parameters of the vessel. An interposed injector will increase flow backpressure and require an increased ballast water pump capacity. Applicants' calculations indicate that an interposed venturi will increase a pumping time required to fill ballast tanks of some vessels by one or two hours (about 10%). Further, ballast water conduits may serve both to load ballast water and to discharge ballast water. An interposed injector may interfere with a reversed water flow, for example to discharge ballast water. These disadvantages can be overcome by a preferred embodiment of the invention wherein ozone is injected into a portion of ballast water in a line that bypasses a part of the main water conduit.

A further preferred embodiment of bypass line ozone injection is based on consideration of the physical and chemical nature of ozone in ballast water including the solubility of ozone in seawater and the relationship of the chemical reactions of the ozone to solubility.

Ozone ($O_3$) is an allotropic form of oxygen. It is an unstable blue gas with a pungent odor, a molecular weight of 48 g/mol and a density as a gas of 2.154 g/liter at 0° and 1 atm. It is approximately 13 times more soluble in water than is oxygen. Ozone is highly unstable and is a powerful oxidizing agent. It is 1.5 times better and approximately 3125 times faster than chlorine as an oxidizer. It is non-persistent and has a very short half-life.

Typically, ozone is produced by passing oxygen, in some concentration, through a highly charged corona field, a technique known as "corona discharge". The corona may be produced by applying a very high electric potential (up to 20 kV) between two conductors that are separated by an insulating dielectric layer and a small air gap. Under these conditions, molecular oxygen ($O_2$) passing through the gap between the conductors experiences sufficient dissociation energy to partially dissociate. A certain fraction of the free oxygen radicals will re-associate in the form of $O_3$, according to the equilibrium reaction equation:

$$3O_2 + 69\ \text{kcal} \leftrightarrows 2O_3 \tag{I}$$

The generation of ozone as represented by equation (I), is an equilibrium reaction. The reaction is endothermic to produce $O_3$, requiring energy, and is exothermic to produce $O_2$, giving up energy. Because of its equilibrium nature, the actual conversion to ozone is relatively low, in the range of 2-12%, depending on the oxygen content of feed gas and the temperature of the reaction.

Other considerations in providing an effective ozone treatment method and system relate to the mechanism of gas treatment of ballast water. McNulty, U.S. Pat. No. 6,840,983 discloses a ballast water treatment system that comprises an injector interposed in a main water conduit with an inlet port adapted to receive the water, an injector port adapted to receive an oxygen stripping gas and an outlet port adapted to expel the water. McNulty injects an oxygen stripping gas that scavenges oxygen from the ballast water purported to cause suffocation of oxygen-dependent species. On the other hand, ozone is an oxidizing gas that has different and at least double disinfecting mechanisms. These mechanisms include rapid conversion of naturally occurring ballast water chemical constituents into products that are toxic to organisms as well as direct ozone destructive oxidation of organisms.

The following four equations (Von Gunten & Hoigné, 1994) describe the utilization of ozone in seawater assuming the only ozone demand is between ozone and dissolved bromide.

$$O_3 + Br^- \rightarrow OBr^- + O_2\ 160\ M^{-1}s^{-1} \tag{1}$$

$$OBr^- + O_3 \rightarrow 2O_2 + Br^-\ 330\ M^{-1}s^{-1} \tag{2}$$

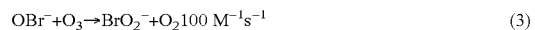
$$OBr^- + O_3 \rightarrow BrO_2^- + O_2\ 100\ M^{-1}s^{-1} \tag{3}$$

$$BrO_2^- + O_3 \rightarrow BrO_3^- > 10^5\ M^{-1}s^{-1} \tag{4}$$

The reaction rate of ozone with bromide—reaction (1), creates another, much more stable oxidant, hypobromous ion, while this consumes ozone, with the ozone reacting to the more stable, lower-energy allotrope $O_2$. The half-life of the ozone, i.e. the time it takes for an ozone concentration to reach half of its value, can be calculated from reactions (1) and (2) as about 5 seconds. If the average rate of conversion over 5 seconds consumes 50% of the ozone, then average consumption of ozone per ¼ second will be ½$^{th}$ of 50%, i.e. 2.5%.

However, since the reaction rate during the first ¼ second is twice as high, the ozone consumption will be 2.5%×2=5% during the first ¼ second.

Hypobromous ion (OBr—) is created in reaction (1). Most of the reaction (1) ion is then converted to hypobromous acid (HOBr) by addition of a hydrogen ion from water. The hypobromous ion and hypobromous acid formed are known as total residual oxidant (TRO). Only reaction (1) leads to the formation of TRO. The further reactions (2) to (4) undesirably remove both ozone and bromine products from the disinfectant process. A first goal of seawater ozonation is to convert as much ozone as possible to HOBr or OBr⁻. Therefore, maximizing reaction (1) and minimizing reactions (2)-(4) will maximize OBr⁻.

The reactions shown are of second order. The given reaction rate constants indicate the speed at which the reaction occurs as a function of the ozone concentration. To determine a relative rate between reactions (1) and (2), the rate constant of (2) is divided by that of (1). The rate of reaction (2) is approximately 2 times faster than reaction (1)—that is for equal concentrations of the reactants.

The above reaction rates are such that if the molar concentration ratio of Br— to OBr— drops below about 2.7, further ozone dosages do not produce more OBr— as the ozone consumption in reactions (2) and (3) will exceed reaction (1). The hypobromous ion forming reaction dominates when ozone is introduced into an excess of bromide. Typically about 70 mg/L of bromide is available in seawater. This provides enough bromide excess to minimize ozone losses at typical ozonation levels (1 to 5 mg/L of ozone) into a conduit of loading or unloading ballast water. However, a bypass line will present a lesser amount of water and a corresponding lesser amount of bromide available to be used up before dominance of the ozone and OBr⁻ dissipation reactions (2) to (4).

The available amount of bromide in bypass seawater needs to be taken into consideration when determining a flow rate or retention time for bypass ozonation. Retention time is a period for transport of ozone and water from a point of injection of the ozone to reinjection of bypass water and ozone into a main conduit. In an embodiment, a method and system are provided whereby dissipating ozone and OBr⁻ reactions are minimized while the synergistic disinfection by ozonation and bromination is maintained. According to an embodiment of the invention, a method and system are provided to minimize retention time. In this specification, retention time is a period of time from injection of ozone into water in a bypass to reinjection time of the bypass line seawater into the seawater of a main conduit or tank. An embodiment of the invention provides for reinjecting an ozone treated bypass water portion back into a "bromide rich" main conduit seawater to avoid substantial ozone and OBr⁻ consumption in $BrO_2^-$ and $BrO_3^-$ formation and oxygen reversion per reactions (2) to (4). "Retention time" is minimized.

In an embodiment, a 0.21 second retention time results in an acceptable 4.3% ozone loss. According to an embodiment of the invention, a method and system are provided wherein retention time is controlled at less than 5 seconds, desirably less than 0.25 seconds and preferably less than 0.21 seconds to minimize reactions (2) to (4).

Features of the invention will become apparent from the drawings and following detailed discussion, which by way of example without limitation, describe preferred embodiments of the invention.

Figure 2:
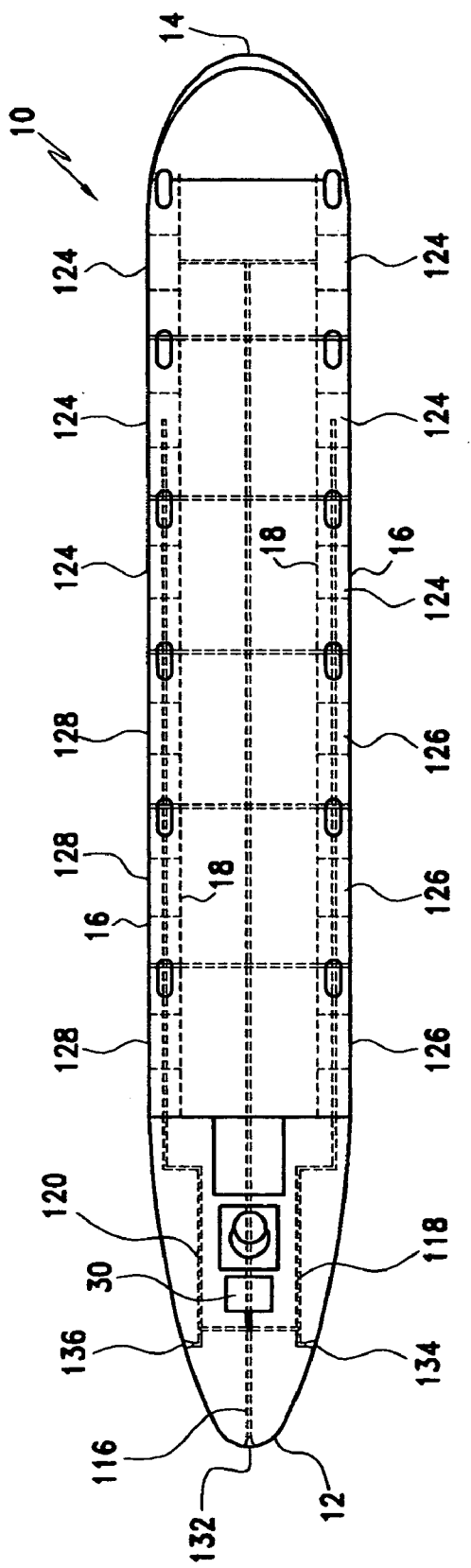
FIG. 2 is a schematic side view of the vessel and treatment system.
Figure 3:
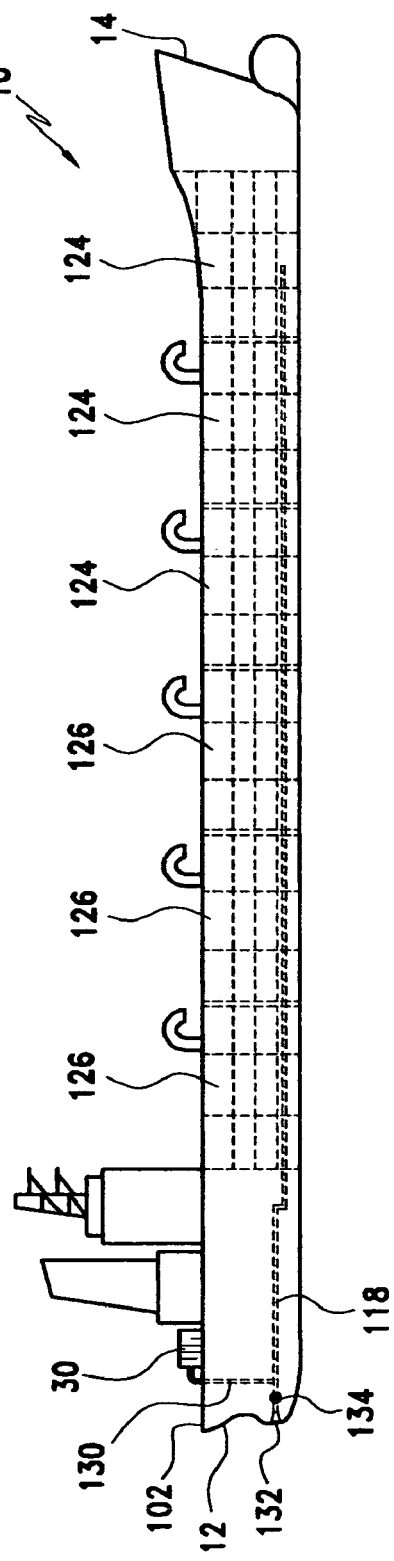
FIG. 3 is a schematic top view of the vessel and treatment system.

FIGS. 1 to 3 schematically show vessel 10 including stern 12, bow 14 and a double hull formed from outer hull 16 and inner hull 18. Vessel 10 is representative of the types of vessels encompassed within the invention and is a conventionally proportioned double-hulled oil tanker having cargo compartments within inner hull 18. However, the present invention can be applied to any sea faring ship or vessel that has ballast tanks or bilge water. The vessel 10 is typical of vessels that transport partly or fully refined or residual petroleum or other bulk liquid products such as seed oil.

Ozone generator 30 is illustrated located on vessel 10 aft deck 102 with main ozone feed line 130 shown as part of the ozone injection system of the invention. Generator 30 can be structured and can generate ozone according to known ozone generators such as described by Rodden U.S. Pat. Nos. 6,125,778; 6,139,809; and PCI-WEDECO (PCI-WEDECO Environmental Technologies, 1 Fairfield Crescent, West Caldwell, N.J. 07006) type SMO/SMA series generators and WEDECO Effizon® technology high concentration ozone production generators as examples. The disclosures of these patents are incorporated herein by reference in their entirety.

Ozonated gas is pumped through generator 30 and subsequently through line 130 for injection into water in respective ballast water intake/discharge conduits 116, 118 and 120 via respective connector lines in accordance with the FIGS. 1 through 3 embodiment of the invention. See also connector lines 110, 112 and 114 of FIG. 4A of U.S. Pat. No. 7,273,562. Intake/discharge conduit 116 conveys water from stern intake/outlet sea chest 132 to forward battery 124 of ballast tanks. Intake/discharge conduit 118 conveys water from starboard intake/outlet sea chest 134 to a starboard battery 126 of ballast tanks. Intake/discharge conduit 120 conveys water from port intake/outlet sea chest 136 to a port battery 128 of ballast tanks.

Ballast water is loaded into the vessel 10 via the sea chests 132, 134, 136 and is then pumped to load respective ballast tank batteries 124, 126, 128 through the system of conduits 116, 118 and 120 shown. At a destination location, the process is reversed and water is pumped from tank batteries 124, 126, 128 through the respective conduits 116, 118, 120 for discharge through respective sea chests 132, 134, 136 to the sea. Or, discharge can be effected through another, separate conduit and sea chest system (not shown) from tank batteries 124, 126, 128. After injection with ozone, the water is conveyed by one of the main conduits 116, 118, 120 to respective tank batteries 124, 126, 128. As each main conduit 116, 118, 120 passes through each ballast tank 124, 126 or 128, a smaller footer pipe (not shown) can be taken off to provide a suction/discharge conduit. Valving for the footer pipe can be contained in a tunnel or cofferdam area, or actually placed in the tank itself, if space is an issue.

In FIGS. 2 and 3, conduit 118 delivers ozone treated water to each ballast tank of a starboard battery of tanks 126 and conduit 120 delivers ozone treated water to each ballast tank of a port battery of tanks 128. Water enters through respective sea chests 134 and 136 and is treated and charged into a tank of either the starboard battery 126 or the port battery 128 until each respective tank is sufficiently filled and balanced to compensate for off-loaded cargo. Similarly, as shown in FIGS. 2 and 3, water enters through stern sea chest 132, is treated with ozone and charged into a tank of forward battery 124 until each tank is filled to balance the vessel 10.

Figure 4:
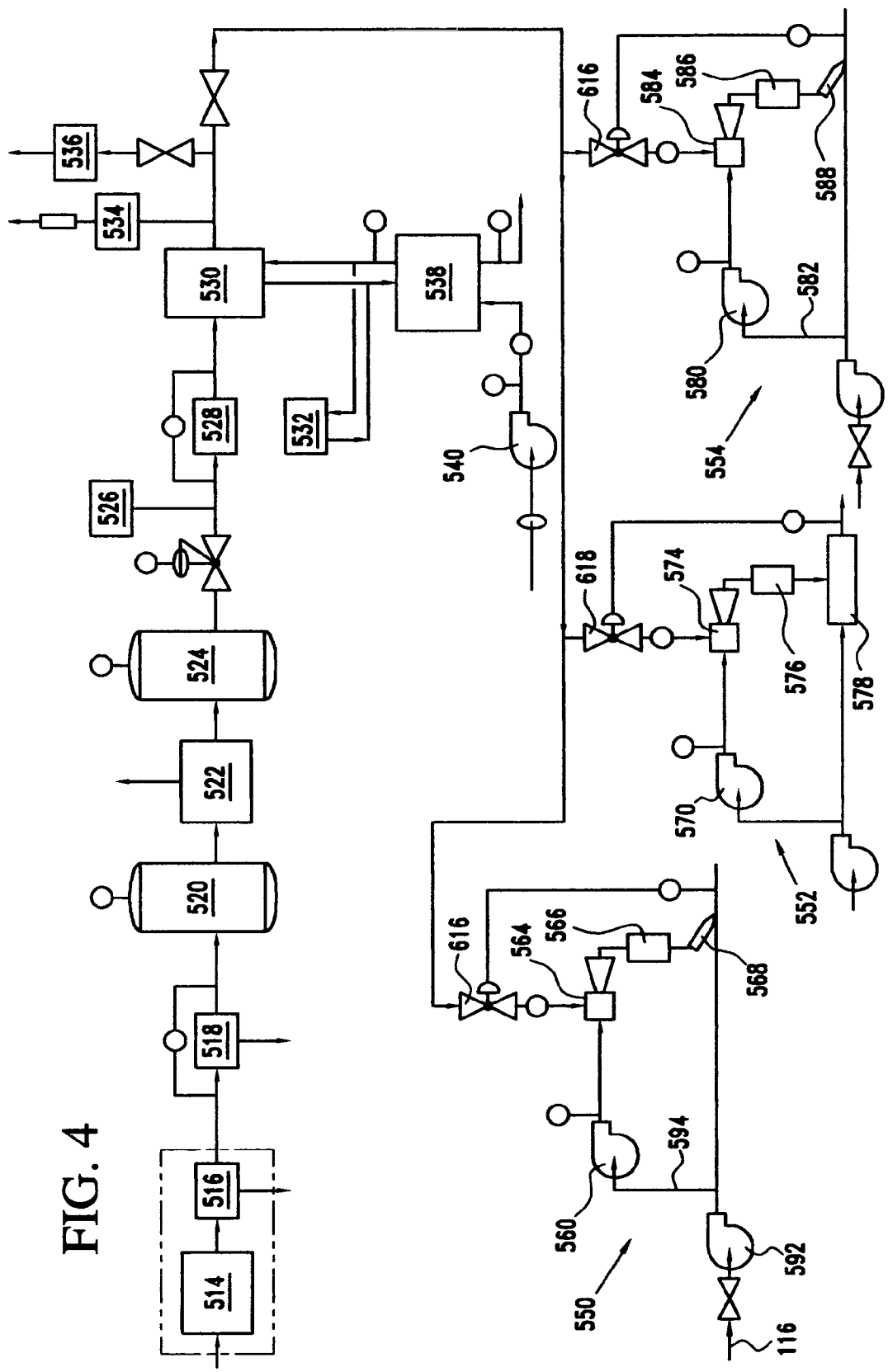
FIG. 4 is a flow diagram of a method and system for ballast water ozone injection.

FIG. 4 is a flow diagram of an embodiment of a method and system for ballast water ozone injection that can be used in conjunction with the system of vessel 10 shown in FIGS. 1 to 3. In FIG. 4, ozone generation system 502 includes air compressor 514, refrigerated air dryer 516, coalescing filter 518, air receiver 520, $O_2$ enricher 522, $O_2$ receiver 524, dew point monitor 526, filter 528, ozone generator 530, power supply 532, ozone monitor 534, ozone destruct unit 536 and chiller 538 with circulation pump 540. In operation, air is drawn into the system 502 via air intake 512. The air is compressed 514, dried and refrigerated 516, filtered 518 and temporarily stored in 520. Then according to generator demand, air is withdrawn to enricher 524, where oxygen content of the gas is increased by adsorption of nitrogen. Oxygen enriched gas is delivered to receiver 524, monitored 526 and filtered 528 until injected into ozone generator 530 operated via power supply 532. Off-gas from generator 530 is monitored 534, and destroyed 536 to prevent environment discharge. Generated ozone is stored at chiller 538 until demanded by bypass injection systems 550, 552, 554 as hereinafter described.

FIG. 4 shows three separate bypass injection systems 550, 552, 554, which can correspond respectively to injection into aft intake conduit 116, injection into starboard intake conduit 118 and injection into port intake conduit 120 as shown in FIGS. 2 and 3. Bypass injection system 550 includes ozone injector pump 560, venturi 564, static mixer 566 and main conduit reinjector 568. Similarly bypass injection system 552 includes ozone injector pump 570, venturi 574, static mixer 576 and main conduit reinjector 578 and bypass injection system 554 includes ozone injector pump 580, venturi 584, static mixer 586 and main conduit reinjector 588.

Figure 5:
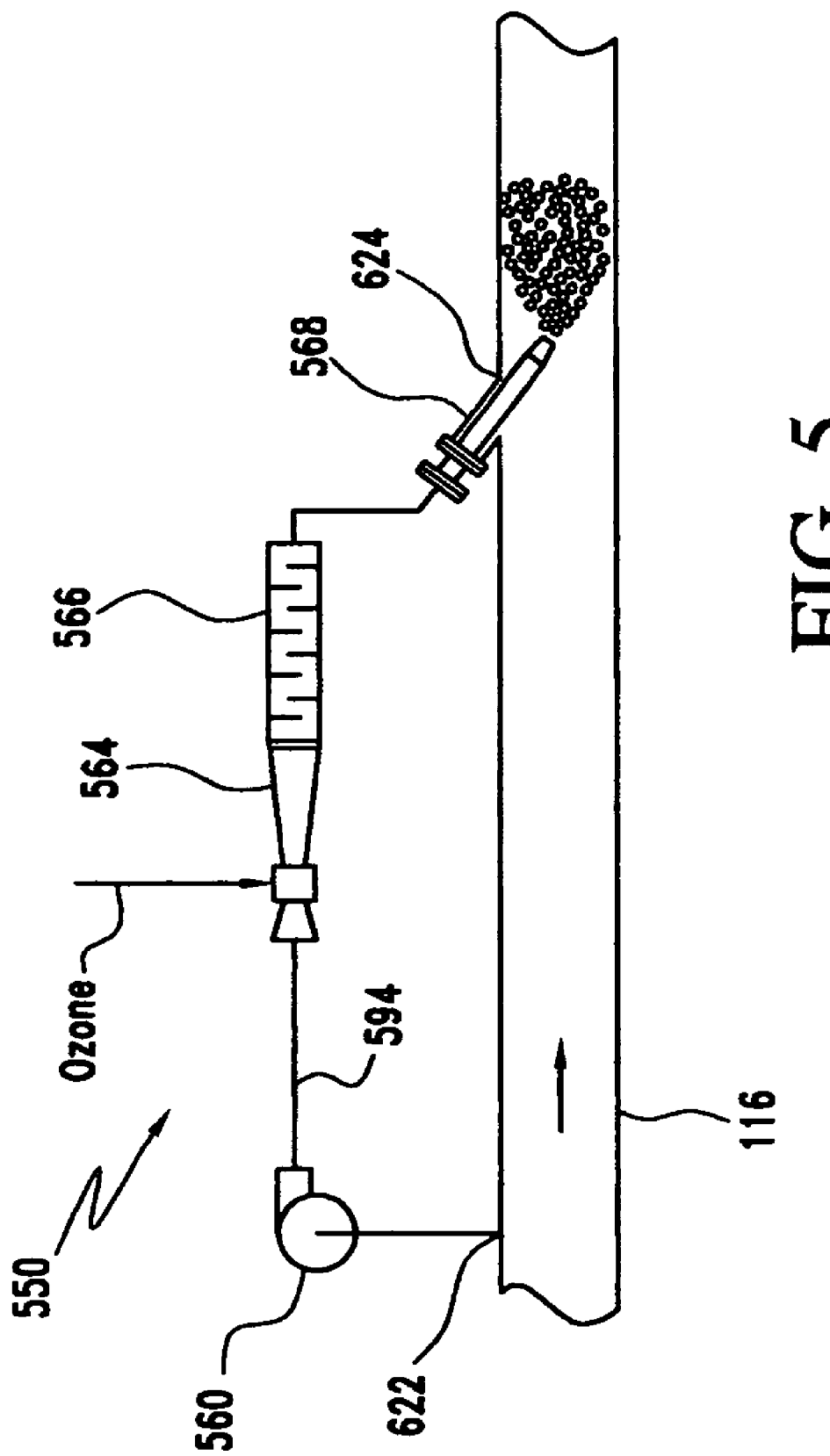
FIG. 5 is a schematic side view of a bypass conduit system.

FIG. 5 schematically shows detail of bypass injection of ozone into a diverted portion of water loading to or unloading from a ballast tank. The bypass injection allows for ozone injection, provides proper mixing and solubilization of the ozone gas into the ballast water and proper remixing of the ozonated diverted portion with the main water flow. Shown in FIG. 5 is exemplary aft load/discharge bypass injection system 550. FIG. 5 shows a bypass conduit 594 that diverges from main conduit 116 at an upstream point 622 and reconverges with the main conduit 116 at a downstream point 624. Bypass conduit 620 includes pump 560, venturi 564, mixer 566 and main conduit reinjector 568.

The injector 564 can be any gas into fluid injector such as a jet injector, but preferably is a venturi to address the requirements of mixing gas into a high volume of liquid to achieve a high degree of solubility. Further, a venturi is desirable because of its very low power consumption, few moving parts, and minimal system backpressure.

The ozone gas/water mixture is processed through a static mixer after exiting the venturi injector. Mixer 566 is a static mixer that provides additional solubilization of ozone into the water and ensures that entrained ozone gas bubbles are uniformly dispersed in the bypass conduit water. Mixer 566 can be any suitable mixer but a static mixer is preferred. Typically, a static mixer comprises a series of fins, obstructions, or channels mounted or fixed into a piping arrangement. The fins, obstructions or channels are designed to promote further mixing of the ozone gas and ballast water liquid. A static mixer may use some method of first dividing the flow, then rotating, channeling, or diverting it. The static mixer intensifies the physical and chemical processes of ozone solubilization. The intensified mixing lengthens the distance covered by gas bubbles and breaks the bubbles into still smaller bubbles thereby increasing the ability to transfer ozone from the gas mixture to the water. The mixer of the system can provide an additional 5-10% solubilization.

The static mixer 566 is selected by considering the material to be processed and the rate at which it must be processed. A static mixer with at least 12 elements or equivalent composite mixer should be used to fit a pipe of the same diameter as that exiting from the injector. In addition, allowable pressure drop must be assessed, in order to make certain that the bypass circulating pump has both flow capacity and pressure capability to provide proper mixing in the static mixer. Also, the water flow rate should be high enough to ensure a low enough contact time to minimize ozone losses to wasteful by reactions in seawater.

Taking system 550 as an exemplary system, operation is described as follows: Water from sea chest 132 is fed in conduit 116 via main ballast water pump 592 to injection system 550. A portion of the water is diverted by circulation pump 560 from conduit 116 into bypass line 594. Flow of the diverted water portion is controlled by venturi 564. Venturi 564 injects ozone from generator 530 into the diverted water portion. The injected ozone is dispersed further into the water portion by static mixer 566 and combined back with the main water in conduit 116 at mainline reinjector 568.

The following examples serve as illustrations and are not intended as limitations of the present invention as defined in the claims.

EXAMPLE I

In this EXAMPLE, ballast water is fed from an intake/discharge conduit between a sea chest and a battery of ballast tanks of a 100,000 to 150,000 DWT tanker. The water is fed at a 10,000 gpm flow rate. The seawater contains 70 mg/L of bromide.

A bypass stream of water is diverted from the intake/discharge conduit at a constant flow into a bypass conduit system illustrated in FIG. 5. Ozone gas is fed under slight pressure (12-15 psi) from its generating source through 316L stainless steel piping to a venturi injector. The ozone is injected as a 10-12% ozone in oxygen admixture. A bypass flow rate is set to permit effective injection by the venturi. In this EXAMPLE, a bypass flow rate is set at 66 gpm and pressure of approximately 90 psi. This flow rate is 0.3% of the main flow for every mg/L of ozone to be dosed (2.0 mg/L in this EXAMPLE). Flow and pressure are maintained by a positive displacement pump.

The selected flow rate and pressure are confirmed as follows: The flow ratio between the main flow and that in the bypass is about 10,000 gal/min to 66 gal/min. The specific ozone dosage in the bypass to achieve 2 mg/L in the main stream would be 303 mg/L so that with only 70 mg/L of bromide in the seawater, $OBr^-$ would exceed $Br^-$ by far The beneficial reactions producing $OBr^-$ will only start once the bypass stream is remixed with the main stream. Hence, bypass retention time is minimized to avoid as much ozone reaction as possible and to meet the main dosage requirement of 2.0 mg/L.

The bypass injection venturi minimizes back-pressure and provides 90-95% solubilization of ozone gas in seawater.

EXAMPLE II

In this EXAMPLE, bypass piping length for the bypass 594 is limited and a higher than typical pumping rate is maintained to reduce retention time down to almost 0.2 seconds as follows:

A bypass flow rate of 66 gpm typically requires a 2" pipe size. In this EXAMPLE, a smaller pipe size is selected to improve the flow velocity. Since back pressure on the venturi is also a limitation, the selected pipe size is decreased by only one size increment, i.e. to 1½". The cross-sectional area of a 1½" Schedule 80 pipe is 0.01227 square feet. The flow rate is $(66/(7.48\times60))=0.1471$ ft$^3$/sec, so that the velocity in the pipe is increased to $0.1471/0.01227=12$ ft/sec.

The bypass system is designed to provide a minimum length (retention length) from venturi to main conduit reinjection point as follows. The retention length is limited to a first 15 nominal diameters length to accommodate a static mixer and an additional 30 inches to accommodate an angled reinjector. The retention length for these requirements is 2.5 feet. The resulting retention time in traveling 2.5 ft at 12 ft/sec=0.21 s.

While preferred embodiments of the invention have been described, the present invention is capable of variation and modification and therefore should not be limited to the precise details of the EXAMPLES. The invention includes changes and alterations that fall within the purview of the following claims.

What is claimed is:

1. A method of ozone treatment, comprising:
   identifying a species-destructive reaction product of ozone with a water constituent;
   determining a life of the reaction product; and
   contacting ozone with a water containing the species for a period determined according to the determined life of the reaction product.

2. The method of claim 1, wherein the water is seawater and the species destructive reaction product is $OBr^-$.

3. The method of claim 1, wherein the water is seawater and the species destructive reaction product is $OBr^-$ and further wherein the ozone is contacted with seawater for a period controlled to maintain a molar ratio of $Br^-$ to $OBr^-$ well above 2.7.

4. The method of claim 1, wherein the contacting period is controlled for a period specified below a limit according to the determined life of the reaction product.

5. The method of claim 1, wherein the period is less than 5 seconds.

6. The method of claim 1, wherein the period is less than 0.25 second.

7. The method of claim 1, wherein the period is less than 0.21 second.

8. A method of ozone treatment, comprising:
   diverting a portion of water charging into a ballast tank of a vessel;
   injecting ozone into the portion to provide an ozonated portion; and
   recombining the ozonated portion with the water charging into the ballast tank;
   wherein the water is seawater containing bromine that reacts with ozone to provide an $OBr^-$ reaction product, and a retention period between injecting the ozone into the portion and recombining the injected ozone portion with the water charging into the tank is controlled below a specified time limit such that the ozone is contacted with the seawater for a period controlled to maintain a molar ratio of $Br^-$ to $OBr^-$ above 2.7.

9. The method of claim 8, wherein the retention period is limited by controlling bypass fluid flow velocity.

10. The method of claim 8, wherein the retention period is limited by bypass pipe length.

11. The method of claim 8, wherein the retention period is controlled for a period specified below a limit according to the determined life of a reaction product.

12. The method of claim 8, wherein the retention period is controlled for a period specified below a limit according to the determined life of a reaction product by establishing a length between a point of ozone injection and a point of recombining the injected portion with the water charging to the ballast tank.

13. The method of claim 8, wherein the retention period is controlled for the period by controlling a rate of flow of the diverted portion.

14. A method of ozone treatment, comprising:
   diverting a portion of water charging into a ballast tank of a vessel;
   injecting ozone into the portion to provide an ozonated portion; and
   recombining the ozonated portion with the water charging into the ballast tank;
   wherein a retention period between injecting the ozone into the portion and recombining the injected ozone portion with the water charging into the tank is controlled below a specified time limit of 5 seconds.

15. The method of claim 14 wherein the retention period is less than 0.25 second.

16. The method of claim 14 wherein the retention period is less than 0.21 second.

* * * * *